(12) United States Patent
Karande

(10) Patent No.: US 11,432,054 B2
(45) Date of Patent: Aug. 30, 2022

(54) FIRE WATER NETWORK LEAK DETECTION SYSTEM

(71) Applicant: Saudi Arabian Oil Company, Dhahran (SA)

(72) Inventor: Dadasaheb Karande, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 90 days.

(21) Appl. No.: 16/904,274

(22) Filed: Jun. 17, 2020

(65) Prior Publication Data

US 2021/0400361 A1 Dec. 23, 2021

(51) Int. Cl.
*H04Q 9/00* (2006.01)
*G01M 3/26* (2006.01)
*G08B 21/18* (2006.01)
*H04L 67/12* (2022.01)

(52) U.S. Cl.
CPC ............ *H04Q 9/00* (2013.01); *G01M 3/26* (2013.01); *G08B 21/18* (2013.01); *H04L 67/12* (2013.01); *H04Q 2209/60* (2013.01)

(58) Field of Classification Search
CPC .......... G01M 3/26; G08B 21/18; H04L 67/12; H04Q 2209/60
See application file for complete search history.

(56) References Cited

U.S. PATENT DOCUMENTS

| | | | |
|---|---|---|---|
| 2010/0032172 A1* | 2/2010 | Aspunvik | A62C 3/10 169/13 |
| 2013/0036796 A1* | 2/2013 | Fleury, Jr. | G01M 3/00 73/40.5 R |
| 2018/0230681 A1* | 8/2018 | Poojary | E03B 7/078 |
| 2019/0169982 A1* | 6/2019 | Hauge | E21B 47/07 |
| 2020/0003646 A1* | 1/2020 | Krywyj | G01L 19/086 |

OTHER PUBLICATIONS

PCT International Search Report and Written Opinion in International Appln. No. PCT/US2021/036596, dated Oct. 21, 2021, 14 pages.

\* cited by examiner

*Primary Examiner* — Quan Zhen Wang
*Assistant Examiner* — Mancil Littlejohn, Jr.
(74) *Attorney, Agent, or Firm* — Fish & Richardson P.C.

(57) ABSTRACT

Systems and methods include a computer-implemented method for monitoring fire water networks. A fire water network (FWN) is monitored for leaks in real-time. Current instrument readings are received from instruments in the FWN. A leak signature associated with the FWN is generated in real-time using the current instrument readings. The leak signature is configured to identify the presence or absence of leaks in the FWN. The leak signature is compared, in real-time, to historical leak signatures associated with historical leaks. A determination is made, based on the comparing, the presence or the absence of a leak in the FWN. Upon determining the presence of the leak, a notification of the leak is automatically provided. Upon determining the absence of the leak, monitoring of the FWN for leaks is continued.

20 Claims, 6 Drawing Sheets

FIRE WATER NETWORK LEAK DETECTION SYSTEM

BACKGROUND

The present disclosure applies to techniques that can be used for the detection of leaks in fire water networks.

Incidents that are associated with fire water network (FWN) leakage can result in significant damage to a company's facility infrastructure. Typically, no mechanisms exist that can automatically detect a leak in an FWN. As a result, leak incidents in FWNs are typically detected only by personnel. Major leaks that go noticed (for example, leaks that occur at night) may cause damage for an extended time and can significantly affect a plant facility. In addition, small leaks that occur may not produce visual evidence of the leaks, since the water may not rise to the surface. These types of leaks can degrade the integrity of the FWN. In addition, such small, undetected leaks can increase the possibility of a catastrophic failure at the FWN when, for example, actual demand is needed. Leak detection systems used in the industry typically do not detect leaks in the FWN in timely manner.

SUMMARY

The present disclosure describes techniques that can be used to provide a fire water network leak detection system (FWNLDS). In some implementations, a computer-implemented method includes the following. A fire water network (FWN) is monitored for leaks in real-time. Current instrument readings are received from instruments in the FWN. A leak signature associated with the FWN is generated in real-time using the current instrument readings. The leak signature is configured to identify the presence or absence of leaks in the FWN. The leak signature is compared, in real-time, to historical leak signatures associated with historical leaks. A determination is made, based on the comparing, the presence or the absence of a leak in the FWN. Upon determining the presence of the leak, a notification of the leak is automatically provided. Upon determining the absence of the leak, monitoring of the FWN for leaks is continued.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/ the instructions stored on the non-transitory, computer-readable medium.

The subject matter described in this specification can be implemented in particular implementations, so as to realize one or more of the following advantages. First, fire water network (FWN) leak detection systems can be deployed in all operating facilities where FWNs are installed. Second, detecting FWN leaks at an early stage can prevent major incidents and can maintain FWN network integrity. Accomplishing this can improve (and maintain) the safety and integrity of a facility and ensure that the FWN is available when actual demand arises. Third, leaks can be detected in the early stages, and operators can be alerted to take necessary action in a timely manner. Fourth, pre-defined processes and algorithms can be used to read various parameters (for example, associated with equipment readings) to detect a leak in a precise and timely manner.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description describes techniques for providing a fire water network (FWN) leak detection system. For example, the FWN can be a fire water system that includes a pumping system configured to provide a sufficient flow of water to extinguish a fire. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Techniques that are used to provide a fire water network leak detection system (FWNLDS) can be implemented using a combination of process instrumentation and mathematical computational algorithms. The techniques can overcome many issues and challenges experienced by conventional techniques that do not have automated leak detection methods. For example, conventional FWNs may fail to meet actual demands, and as a result, a small leak can become a catastrophic leak. Plant equipment foundation damage can occur due to undetected leaks around equipment. FWN integrity can be degraded. Unplanned shutdowns and repairs may be needed due to an undetected small leak becoming a larger leak.

Techniques for detecting leak in FWNs can include the following features. FWN integrity can be ensured by detecting leaks faster than without automatic processes. The FWN can be designed and maintained as a safety mitigation layer for a facility. Adequate time can be allocated to repair a fault because small leaks can be detected in the early stages. Techniques can be integrated with any system processors or EDGE device. Operating parameters such as pressure and flow can be monitored without affecting leak detection performance. FWN leak detection techniques can detect all types of leaks using sophisticated algorithms and field instrumentation described in the present disclosure.

In some implementations, a fire water network leak detection system can be implemented as a hybrid solution, for example, including two main layers. A physical layer that includes instrumentation and one or more processors can collect data and feed the data into a mathematical model. An analytical application layer (that includes a mathematical analytical model, for example) can execute applications that use the collected data to create profiles that can be compared with leak signatures. For example, data collected for a System Z can be compared to historical leak signatures collected over time from Systems A-Y. The historical leak signatures can include data (and leak patterns) for leaks that have occurred in the other systems over time.

In the physical layer, the process instrumentation data can be read (or collected) by specialized instrumentations and fed into one or more processors. The process instrumentation data can include, for example, inlet FWN pressure data and flow data, fire hydrant pressure data, the number of pumps currently running, control valve (CV) current positions, and CV travel directions. The process instrumentation (data) received from field instruments can be further processed, analyzed and modeled by high-fidelity mathematical algorithms executed by the processors.

The physical layer can include flow meters, one or more high-resolution pressure sensors throughout the fire water network, one or more pressure sensors on a main header, and positioning of flow meters and control valves. Pump operation status information can be used to generate a profile. Instrumentation can read process instrumentation data on the real-time basis and feed the process instrumentation data to a high-fidelity algorithm that executes, for example, in a process automation system (PAS) central processing unit (CPU). For example, the term real-time can correspond to events that occur within a specified period of time, such as within a few minutes or seconds. The high resolution provided by each instrument can play a major role in a FWNLDS's accuracy. A PAS CPU can have the capability to process (execute) the received process instrumentation data within a specified period of time. Pressure sensor value, flow rate, and control valve opening information can be provided through a connection to a distributed control system (DCS) that can use standard analog topology. As an example, standard analog topologies can be preferred and used because digital communication techniques may degrade performance. In this way, analog signal processing can be faster than digital processing. In addition, pressure sensor sampling rates can be increased to represent process dynamics accurately, enabling algorithms to produce realistic results.

In the application layer, the mathematical model can generate plots that include two-dimensional (2D) pressure-flow profiles for the entire FWN network, and the profiles can be compared with pre-defined leak signatures. The leak signatures can be preconfigured and dynamically created and updated using artificial intelligence. The leak signatures can then be stored in a reference library (or database) for real-time utilizations. Using the instrumentation data, the mathematical tool can determine the integrity of the entire network and identify leaks on a real-time basis using analytical methods. Analytical data that is created can be presented in a meaningful format for use in alerting operators, facility owners, and key stakeholders to take necessary corrective actions. Meaningful formats can include, for example, information displayed in a graphical user interface (GUI), messages sent to the mobile devices of the operators and facility owners, notifications sent by email, and notifications sent over the Internet (for example, to an online monitoring system). Mathematical algorithm models used in the analysis can be executed into any process automation systems (PAS) processors including, for example, remote terminal units (RTU), programmable logic controllers (PLCs), distributed control systems (DCSes), or standalone enhanced data global system for mobile communication (GSM) environment (EDGE) computational capability devices. Combinations of artificial intelligence and analytics can be used to provide accurate and reliable leak detection in the network.

The application layer includes software applications that form the core of the FWNLDS. The software applications can run on the PAS CPU. Information generated by the software applications can be displayed on operator workstations. The information can include, for example, specific alerts about FWN incidents. Algorithms used by the software applications can obtain field process instrumentation data through the PAS system for further processing. The algorithms can analyze and compare data points with standard conditions to identify anomalies. Key process parameters used in the algorithms can include flow and pressure measurements. These type of measurements can be used to simulate an exact replica (or a model) of ideal process behaviors and confirm real values. Core functionalities of the algorithms can statically and dynamically outline leakage signature definitions. Each signature can be a pre-calculated process profile used in case of a leak. The algorithms can plot real-time process behaviors that are compared with signatures. If a current process pattern matches at least one of the leakage signatures, then the system can generate an operator alert indicating a fire water network leakage. The algorithms can also check for any fire incident through an auxiliary system. If the checking indicates that no fire incident exists at a time that the algorithms create an alert for water usage, then the algorithms can declare a real leak in the FWN.

In some implementations, the FWNLDS can suspend processing or mute sections of fire water network if field process instrumentation data is not available or is not provided within specified accuracy and resolution thresholds. Using this approach, the FWNLDS can strictly depend on PAS system and field instrumentation availability and functionality.

Figure 1:
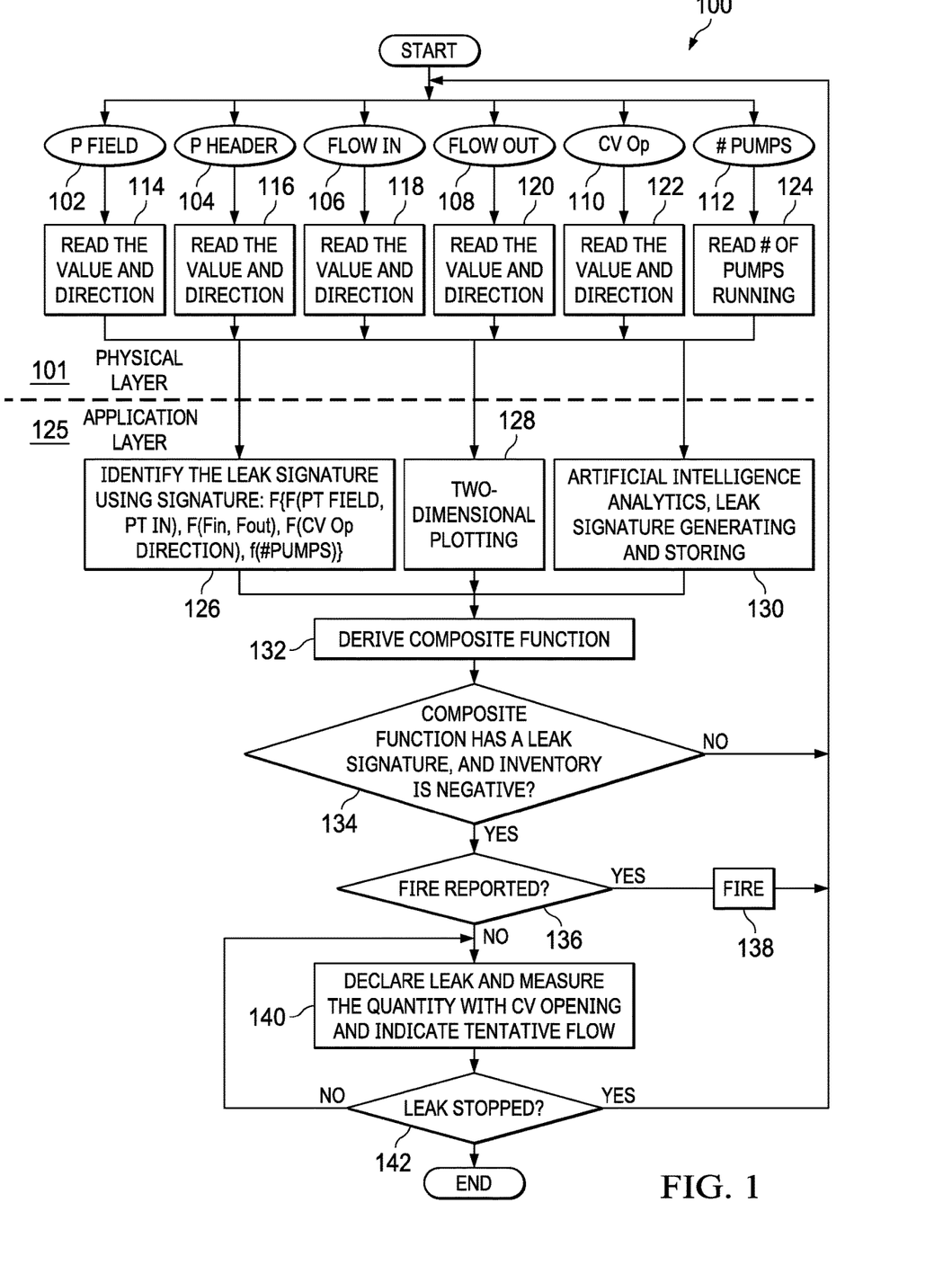
FIG. 1 is a flow diagram showing an example of a workflow for detecting leaks in a fire water network, according to some implementations of the present disclosure.

FIG. 1 is a flow diagram showing an example of a workflow 100 for detecting leaks in a fire water network, according to some implementations of the present disclosure. In a physical layer 101, inputs used by the workflow 100 can include a pressure (P) field 102, a P header 104, a flow IN 106, a flow OUT 108, CV opening (OP) information 110, and a number of pumps 112. For the values 102, 104, 106, 108, and 110, the values and directions are read at 114, 116, 118, 120, and 122, respectively. For the number of pumps 112, the number of pumps that are running is read at 124.

Algorithms used in an application layer 125 can use inputs provided by the physical layer 101 to identify a leak signature at 126. For example, the leak signature can be identified according to Equation (1):

$$\text{Leak Signature} = F\{f(\text{PT field}, \text{PT IN}), f(\text{Fin}, \text{Fout}), f(\text{CV Op direction}), f(\text{\#pumps})\} \quad (1)$$

where PT field is a pressure-temperature field, PT IN is PT input, Fin is flow in, and Fout is flow out. The algorithm can execute the complex function for each group of process parameters, and subsequently the leak signature is generated as a secondary result using all complex functions outputs.

At 128, 2D plotting can be generated using the inputs provided by the physical layer 101. At 130, artificial intelligence (AI) analytics can be used in the determination of whether a potential leak exists, and the leak signature can be generated and stored if the leak is confirmed. At 132, a composite function can be derived that characterizes the potential leak. At 134, a determination is made whether the composite function has a leak signature (indicating the presence of a leak) and whether an inventory is negative, meaning return volume from FWN is lower than FWN inlet flow volume. If the determination indicates the non-presence of a leak, then the workflow 100 can loop back to the steps in which inputs are provided by the physical layer 101.

At 136, a determination is made whether a fire has been reported. If a fire has been reported, then the algorithm records the information at 138. Otherwise, at 140, a leak is declared, and the CV opening and tentative flow are measured and recorded with leak intensity. At 142, if it is determined that the leak has stopped (for example, by actions of rig operators), then the workflow 100 resumes at measuring inputs 102, 104, 106, 108, 110, and 112. Otherwise, actions can be taken to fix the leak, with steps 140 and 142 repeating until the leak is fixed.

Figure 2:
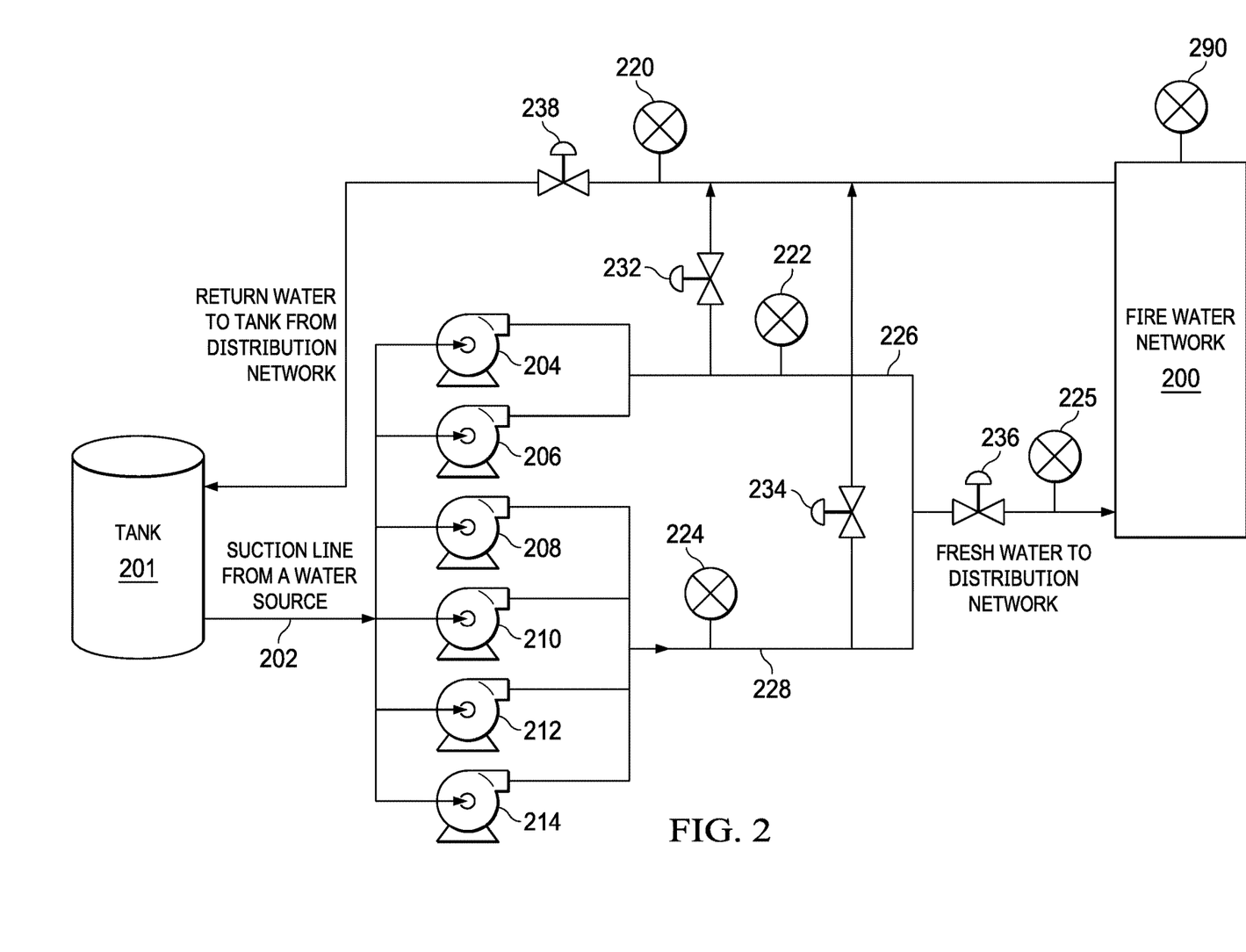
FIG. 2 is a diagram showing examples of flow between pieces of fire protection equipment in a system, according to some implementations of the present disclosure.

FIG. 2 is a diagram showing examples of flow between pieces of fire protection equipment in a system 200, according to some implementations of the present disclosure. Water is introduced in the system 200 through a suction line 202 from a water source 201. The water can be processed, for example, by jockey pumps 204 and 206, electrical pumps 208, 210, and 212, and a diesel pump 214. Pressure transmitters 220, 222, 224, 225, and 290 measure the pressure in lines of the system 200. Water is provided to fire distribution networks through lines 226 and 228. Inside a firewater network, several pressures transmitters are installed to remote pressure indicated 240. Pressure in fire network is regulated through control valves 232, 234, 236 and 238.

Figure 3A:
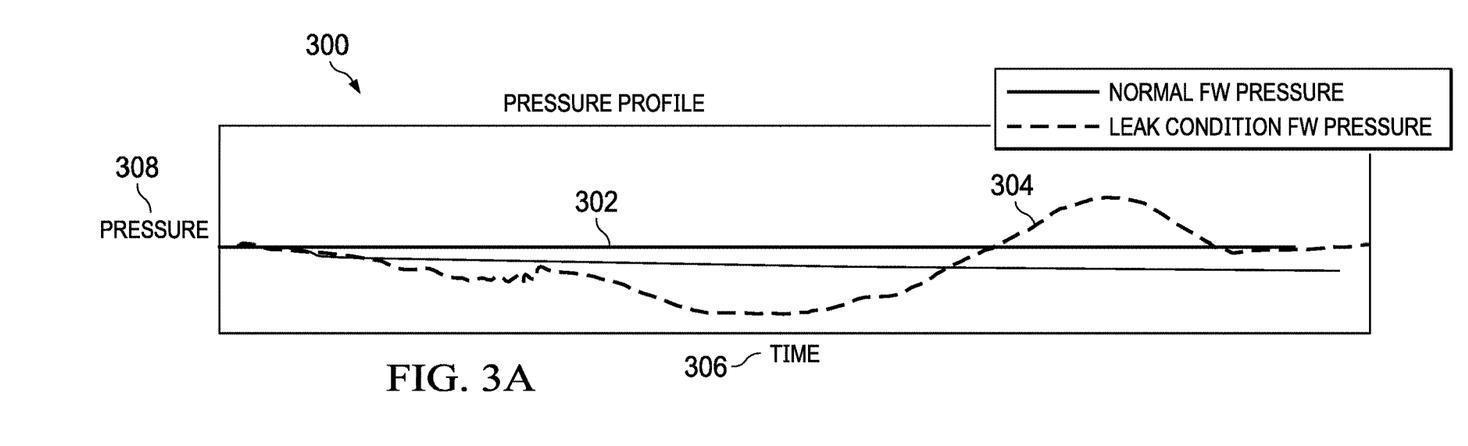
FIGS. 3A and 3B are graphs showing examples of two-dimensional profiles, according to some implementations of the present disclosure.
Figure 3B:
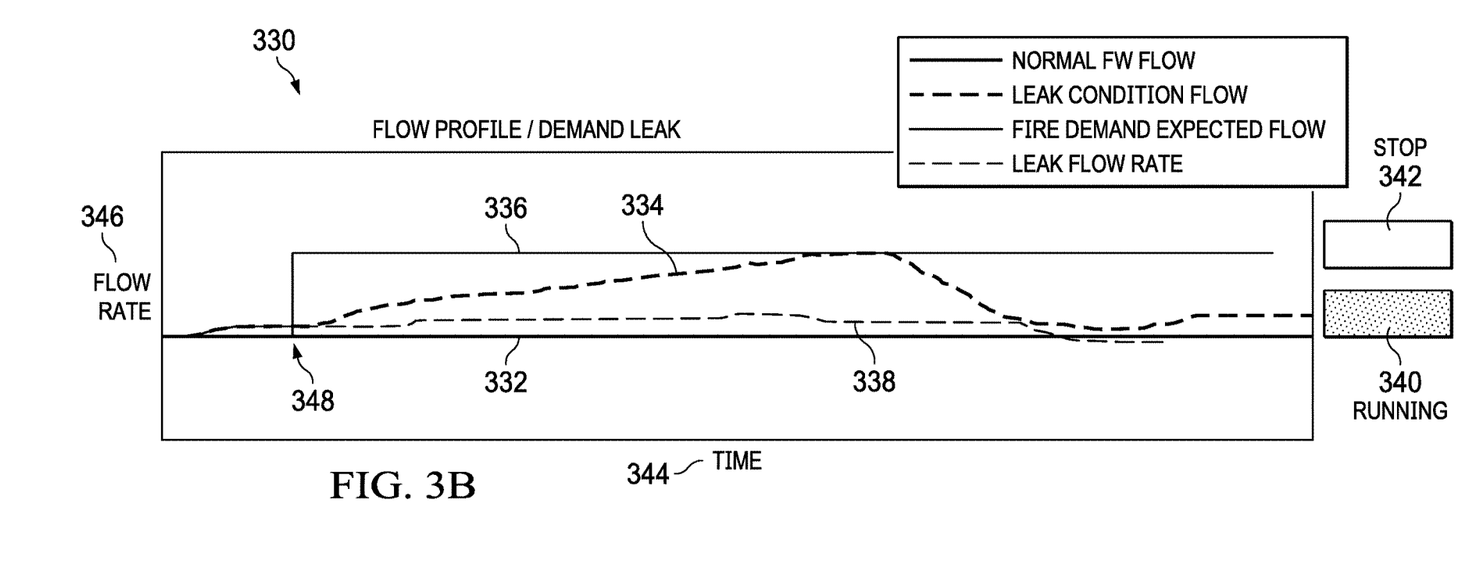

FIGS. 3A and 3B are graphs showing examples of two-dimensional profiles, according to some implementations of the present disclosure. The two-dimensional profiles can be created by the application layer 125, for example.

FIG. 3A shows a pressure profile 300 that includes a normal fire water (FW) pressure 302 and a leak condition FW pressure 304. The pressures 302 and 304 are plotted relative to time axis 306 and a pressure axis 308.

FIG. 3B shows a flow profile 330 that includes a normal FW flow 332, a leak condition flow 334, a fire demand expected flow 336, and a leak flow rate 338. The fire demand expected flow 336 corresponds to a running state 340. The leak flow rate 338 corresponds to a stop state 342. The flows 332, 334, 336, and 338 are plotted relative to time axis 344 and a flow rate axis 346. At time 348, the fire demand expected flow 336 goes from a zero flow to a full flow. Whenever flow demands come through (348) either leak or actual fire water demand through monitors or hydrant, there is increase in flow 334 which drops the FWN pressure 304 which kick starts the electric pumps 340 until FWN pressure restores. FIG. 3B shows a flow profile while FIG. 3A shows a pressure profile.

Figure 3C:
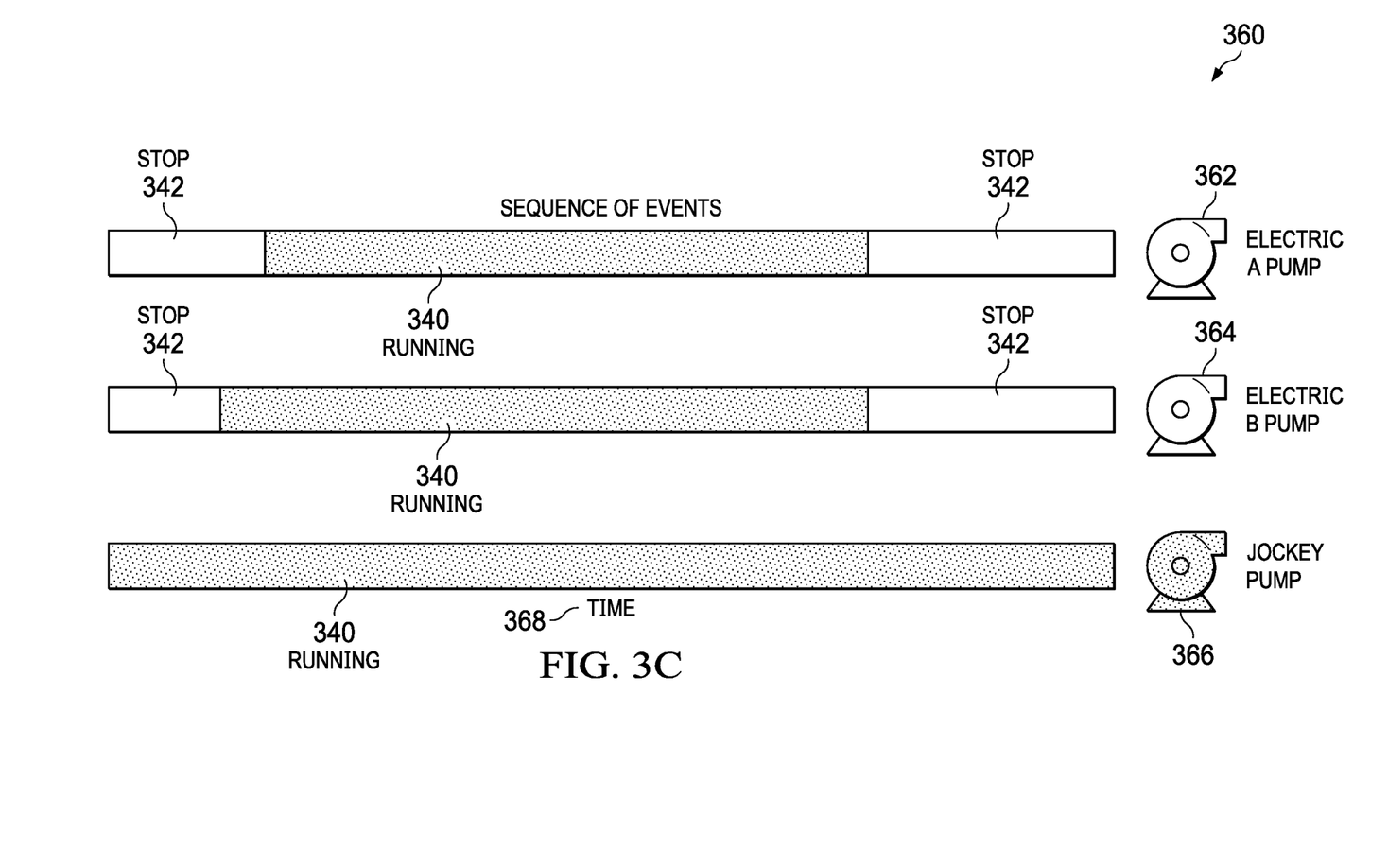
FIG. 3C is a diagram showing examples of running and stop sequences of pumps, according to some implementations of the present disclosure.

FIG. 3C is a diagram showing examples of running and stop sequences 360 of pumps, according to some implementations of the present disclosure. The running and stop sequences 360 show periods of the running state 340 and the stop state 342 for pumps 362, 364, and 366 relative to a time axis 368.

Figure 4:
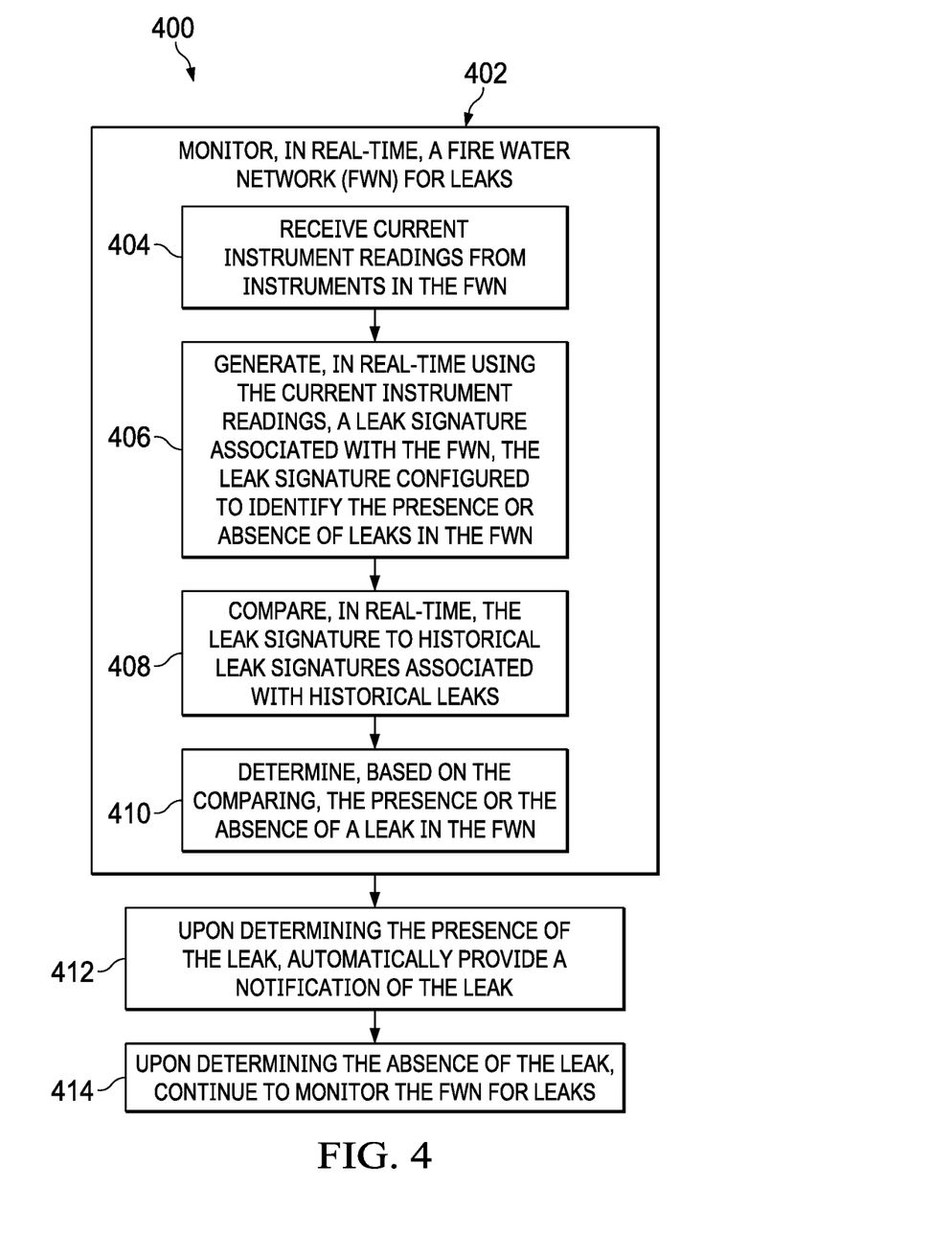
FIG. 4 is a flowchart of an example of a method for using real-time leak signatures to determine a leak in a fire water network, according to some implementations of the present disclosure.

FIG. 4 is a flowchart of an example of a method 400 for using real-time leak signatures to determine a leak in a fire water network, according to some implementations of the present disclosure. For clarity of presentation, the description that follows generally describes method 400 in the context of the other figures in this description. However, it will be understood that method 400 can be performed, for example, by any suitable system, environment, software, and hardware, or a combination of systems, environments, software, and hardware, as appropriate. In some implementations, various steps of method 400 can be run in parallel, in combination, in loops, or in any order.

At 402, a fire water network (FWN) is monitored for leaks (for example, likely or probable leaks) in real-time. Monitoring can be performed by the system 100, for example. In some implementations, monitoring the FWN for potential leaks in real-time is performed using steps 404-410.

At 404, current instrument readings are received from instruments in the FWN. The current instrument readings can include current (for example, instantaneous or within the last few seconds or minutes) pressure readings, flow rates, flow directions, and a number of pumps that currently running. For example, referring to FIG. 1, the current instrument readings can include the values 102, 104, 106, 108, and 110 read at 114, 116, 118, 120, and 122, respectively. From 404, method 400 proceeds to 406.

At 406, a leak signature associated with the FWN is generated in real-time using the current instrument readings. The leak signature is configured to identify the presence or absence of leaks in the FWN. For example, generating the leak signature can include using time-based functions, including different instances of Equation (1) determined over time. In some implementations, generating the leak signature associated with the FWN can include using artificial intelligence to generate a composite function corresponding to the potential leak. From 406, method 400 proceeds to 408.

At 408, the leak signature is compared, in real-time, to historical leak signatures associated with historical leaks. For example, comparing the leak signature to the historical leak signatures includes comparing the composite function corresponding to the potential leak to composite functions corresponding to the historical leak signatures. From 408, method 400 proceeds to 410.

At 410, a determination is made, based on the comparing, of the presence or the absence of a leak in the FWN. From 410 (the last sub-step of step 402), method 400 proceeds to 412.

At 412, upon determining the presence of the leak, a notification of the leak is automatically provided. For example, information associated with the likely presence of the leak can be displayed in a graphical user interface (GUI). In another example, notifications can include messages sent to the mobile devices of the operators and facility owners, notifications sent by email, and notifications sent over the Internet (for example, to an online monitoring system). From 412, method 400 proceeds to 414.

At 414, upon determining the absence of the leak, monitoring of the FWN for leaks is continued. For example, step 402 is repeated, including repeating steps 404-410. After 414, method 400 can stop.

In some implementations, method 400 further includes generating, using multiple sets of the current instrument readings received over time, two-dimensional plots including pressure profiles and flow profiles in normal conditions and leak condition. For example, the plots shown in FIGS. 3A and 3B can be generated using theoretical hydraulic modeling as well as instrumentation data collections. The plots can be presented in a graphical user interface (GUI) provided on computers used by rig operators or petroleum engineers, for example.

In some implementations, method 400 further includes generating a database of historical leak signatures using instrument readings from instruments in plural FWNs. The historical leak signatures can include, for example, characterizations (including leak sizes) of leaks that occurred and information about instrument readings that were captured leading up to the discovery of the leak. The database of historical leak signatures can be used, for example, in step 408.

Figure 5:
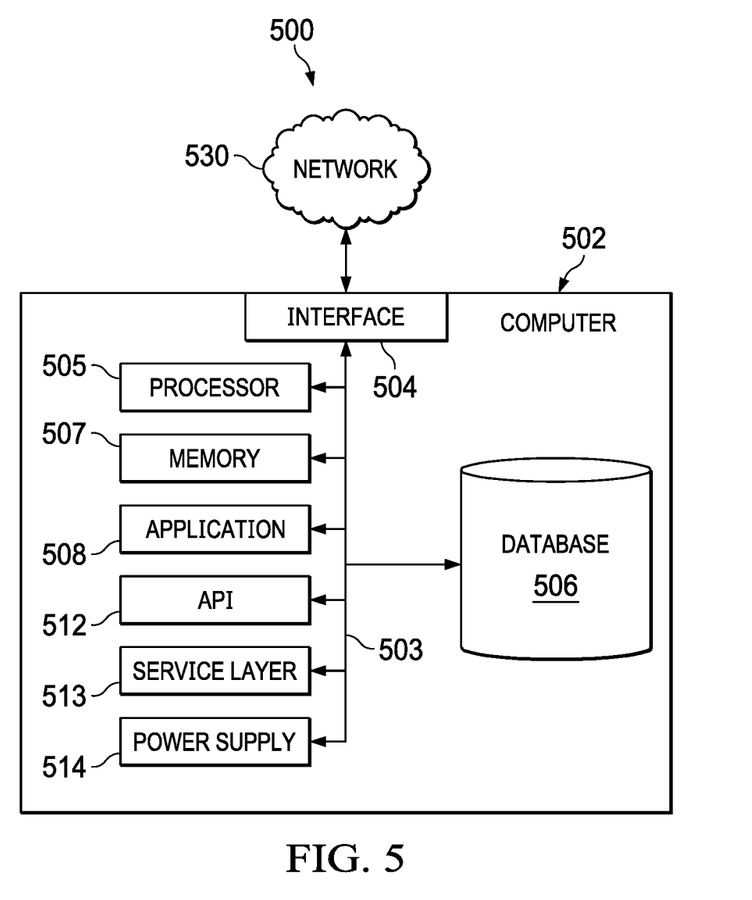
FIG. 5 is a block diagram illustrating an example computer system used to provide computational functionalities associated with described algorithms, methods, functions, processes, flows, and procedures as described in the present disclosure, according to some implementations of the present disclosure.

FIG. 5 is a block diagram of an example computer system 500 used to provide computational functionalities associated with described algorithms, methods, functions, processes, flows, and procedures described in the present disclosure, according to some implementations of the present disclosure. The illustrated computer 502 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 502 can include input devices such as keypads, keyboards, and touch screens that can accept user information. Also, the computer 502 can include output devices that can convey information associated with the operation of the computer 502. The information can include digital data, visual data, audio information, or a combination of information. The information can be presented in a graphical user interface (UI) (or GUI).

The computer 502 can serve in a role as a client, a network component, a server, a database, a persistency, or components of a computer system for performing the subject matter described in the present disclosure. The illustrated computer 502 is communicably coupled with a network 530. In some implementations, one or more components of the computer 502 can be configured to operate within different environments, including cloud-computing-based environments, local environments, global environments, and combinations of environments.

At a top level, the computer 502 is an electronic computing device operable to receive, transmit, process, store, and manage data and information associated with the described subject matter. According to some implementations, the computer 502 can also include, or be communicably coupled with, an application server, an email server, a web server, a caching server, a streaming data server, or a combination of servers.

The computer 502 can receive requests over network 530 from a client application (for example, executing on another computer 502). The computer 502 can respond to the received requests by processing the received requests using software applications. Requests can also be sent to the computer 502 from internal users (for example, from a command console), external (or third) parties, automated applications, entities, individuals, systems, and computers.

Each of the components of the computer 502 can communicate using a system bus 503. In some implementations, any or all of the components of the computer 502, including hardware or software components, can interface with each other or the interface 504 (or a combination of both) over the system bus 503. Interfaces can use an application programming interface (API) 512, a service layer 513, or a combination of the API 512 and service layer 513. The API 512 can include specifications for routines, data structures, and object classes. The API 512 can be either computer-language independent or dependent. The API 512 can refer to a complete interface, a single function, or a set of APIs.

The service layer 513 can provide software services to the computer 502 and other components (whether illustrated or not) that are communicably coupled to the computer 502. The functionality of the computer 502 can be accessible for all service consumers using this service layer. Software services, such as those provided by the service layer 513, can provide reusable, defined functionalities through a defined interface. For example, the interface can be software written in JAVA, C++, or a language providing data in extensible markup language (XML) format. While illustrated as an integrated component of the computer 502, in alternative implementations, the API 512 or the service layer 513 can be stand-alone components in relation to other components of the computer 502 and other components communicably coupled to the computer 502. Moreover, any or all parts of the API 512 or the service layer 513 can be implemented as child or sub-modules of another software module, enterprise application, or hardware module without departing from the scope of the present disclosure.

The computer 502 includes an interface 504. Although illustrated as a single interface 504 in FIG. 5, two or more interfaces 504 can be used according to particular needs, desires, or particular implementations of the computer 502 and the described functionality. The interface 504 can be used by the computer 502 for communicating with other systems that are connected to the network 530 (whether illustrated or not) in a distributed environment. Generally, the interface 504 can include, or be implemented using, logic encoded in software or hardware (or a combination of software and hardware) operable to communicate with the network 530. More specifically, the interface 504 can include software supporting one or more communication protocols associated with communications. As such, the network 530 or the interface's hardware can be operable to communicate physical signals within and outside of the illustrated computer 502.

The computer 502 includes a processor 505. Although illustrated as a single processor 505 in FIG. 5, two or more processors 505 can be used according to particular needs, desires, or particular implementations of the computer 502 and the described functionality. Generally, the processor 505 can execute instructions and can manipulate data to perform the operations of the computer 502, including operations using algorithms, methods, functions, processes, flows, and procedures as described in the present disclosure.

The computer 502 also includes a database 506 that can hold data for the computer 502 and other components connected to the network 530 (whether illustrated or not). For example, database 506 can be an in-memory, conventional, or a database storing data consistent with the present disclosure. In some implementations, database 506 can be a combination of two or more different database types (for example, hybrid in-memory and conventional databases)

according to particular needs, desires, or particular implementations of the computer 502 and the described functionality. Although illustrated as a single database 506 in FIG. 5, two or more databases (of the same, different, or combination of types) can be used according to particular needs, desires, or particular implementations of the computer 502 and the described functionality. While database 506 is illustrated as an internal component of the computer 502, in alternative implementations, database 506 can be external to the computer 502.

The computer 502 also includes a memory 507 that can hold data for the computer 502 or a combination of components connected to the network 530 (whether illustrated or not). Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 5, two or more memories 507 (of the same, different, or combination of types) can be used according to particular needs, desires, or particular implementations of the computer 502 and the described functionality. While memory 507 is illustrated as an internal component of the computer 502, in alternative implementations, memory 507 can be external to the computer 502.

The application 508 can be an algorithmic software engine providing functionality according to particular needs, desires, or particular implementations of the computer 502 and the described functionality. For example, application 508 can serve as one or more components, modules, or applications. Further, although illustrated as a single application 508, the application 508 can be implemented as multiple applications 508 on the computer 502. In addition, although illustrated as internal to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion and management circuits, including recharging, standby, and power management functionalities. In some implementations, the power-supply 514 can include a power plug to allow the computer 502 to be plugged into a wall socket or a power source to, for example, power the computer 502 or recharge a rechargeable battery.

There can be any number of computers 502 associated with, or external to, a computer system containing computer 502, with each computer 502 communicating over network 530. Further, the terms "client," "user," and other appropriate terminology can be used interchangeably, as appropriate, without departing from the scope of the present disclosure. Moreover, the present disclosure contemplates that many users can use one computer 502 and one user can use multiple computers 502.

Described implementations of the subject matter can include one or more features, alone or in combination.

For example, in a first implementation, a computer-implemented method includes the following. A fire water network (FWN) is monitored for leaks in real-time. Current instrument readings are received from instruments in the FWN. A leak signature associated with the FWN is generated in real-time using the current instrument readings. The leak signature is configured to identify the presence or absence of leaks in the FWN. The leak signature is compared, in real-time, to historical leak signatures associated with historical leaks. A determination is made, based on the comparing, the presence or the absence of a leak in the FWN. Upon determining the presence of the leak, a notification of the leak is automatically provided. Upon determining the absence of the leak, monitoring of the FWN for leaks is continued.

The foregoing and other described implementations can each, optionally, include one or more of the following features:

A first feature, combinable with any of the following features, where the current instrument readings include pressure readings, flow rates, flow directions, and a number of pumps that currently running.

A second feature, combinable with any of the previous or following features, where generating the leak signature includes using time-based functions.

A third feature, combinable with any of the previous or following features, the method further including generating, using multiple sets of the current instrument readings received over time, two-dimensional plots including pressure profiles and flow profiles in normal conditions and leak condition.

A fourth feature, combinable with any of the previous or following features, where generating the leak signature associated with the FWN includes using artificial intelligence to generate a composite function corresponding to a possible leak.

A fifth feature, combinable with any of the previous or following features, where comparing the leak signature to the historical leak signatures includes comparing the composite function corresponding to the possible leak to composite functions corresponding to the historical leak signatures.

A sixth feature, combinable with any of the previous or following features, the method further including generating a database of historical leak signatures using instrument readings from instruments in plural FWNs.

A seventh feature, combinable with any of the previous or following features, automatically providing the notification of the leak includes one or more of displaying the notification in a graphical user interface (GUI), sending messages to mobile devices of operators and facility owners, sending notifications by email, and sending notifications over the Internet.

In a second implementation, a non-transitory, computer-readable medium stores one or more instructions executable by a computer system to perform operations including the following. A fire water network (FWN) is monitored for leaks in real-time. Current instrument readings are received from instruments in the FWN. A leak signature associated with the FWN is generated in real-time using the current instrument readings. The leak signature is configured to identify the presence or absence of leaks in the FWN. The leak signature is compared, in real-time, to historical leak signatures associated with historical leaks. A determination is made, based on the comparing, the presence or the absence of a leak in the FWN. Upon determining the presence of the leak, a notification of the leak is automatically provided. Upon determining the absence of the leak, monitoring of the FWN for leaks is continued.

The foregoing and other described implementations can each, optionally, include one or more of the following features:

A first feature, combinable with any of the following features, where the current instrument readings include pressure readings, flow rates, flow directions, and a number of pumps that currently running.

A second feature, combinable with any of the previous or following features, where generating the leak signature includes using time-based functions.

A third feature, combinable with any of the previous or following features, the method further including generating, using multiple sets of the current instrument readings received over time, two-dimensional plots including pressure profiles and flow profiles in normal conditions and leak condition.

A fourth feature, combinable with any of the previous or following features, where generating the leak signature associated with the FWN includes using artificial intelligence to generate a composite function corresponding to a possible leak.

A fifth feature, combinable with any of the previous or following features, where comparing the leak signature to the historical leak signatures includes comparing the composite function corresponding to the possible leak to composite functions corresponding to the historical leak signatures.

A sixth feature, combinable with any of the previous or following features, the method further including generating a database of historical leak signatures using instrument readings from instruments in plural FWNs.

A seventh feature, combinable with any of the previous or following features, automatically providing the notification of the leak includes one or more of displaying the notification in a graphical user interface (GUI), sending messages to mobile devices of operators and facility owners, sending notifications by email, and sending notifications over the Internet.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. A fire water network (FWN) is monitored for leaks in real-time. Current instrument readings are received from instruments in the FWN. A leak signature associated with the FWN is generated in real-time using the current instrument readings. The leak signature is configured to identify the presence or absence of leaks in the FWN. The leak signature is compared, in real-time, to historical leak signatures associated with historical leaks. A determination is made, based on the comparing, the presence or the absence of a leak in the FWN. Upon determining the presence of the leak, a notification of the leak is automatically provided. Upon determining the absence of the leak, monitoring of the FWN for leaks is continued.

The foregoing and other described implementations can each, optionally, include one or more of the following features:

A first feature, combinable with any of the following features, where the current instrument readings include pressure readings, flow rates, flow directions, and a number of pumps that currently running.

A second feature, combinable with any of the previous or following features, where generating the leak signature includes using time-based functions.

A third feature, combinable with any of the previous or following features, the method further including generating, using multiple sets of the current instrument readings received over time, two-dimensional plots including pressure profiles and flow profiles in normal conditions and leak condition.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
monitoring, in real-time, a fire water network (FWN) for possible leaks, wherein the FWN is a fire water system that includes a pumping system configured to provide a sufficient flow of water to extinguish a fire, including:
receiving current instrument readings from instruments in the FWN;
generating, in real-time using the current instrument readings, a leak signature associated with the FWN, the leak signature configured to identify a presence or an absence of a first leak in the FWN, wherein generating the leak signature includes using a composite function of multiple time-based functions, including: a first function of a pressure-temperature (PT) field and a PT input, a second function of a flow in and a flow out, a third function of a control valve opening direction, and a fourth function of a number of pumps in the FWN;
comparing, in real-time, the leak signature to historical leak signatures associated with historical leaks; and
determining, based on the comparing, the presence or the absence of the first leak in the FWN;
upon determining the presence of the first leak, automatically providing a notification of the first leak; and
upon determining the absence of the first leak, continuing to monitor the FWN for second leaks.

2. The computer-implemented method of claim 1, wherein the current instrument readings include pressure readings, flow rates, flow directions, and a number of pumps that are currently running.

3. The computer-implemented method of claim 1, wherein generating the leak signature includes using time-based functions.

4. The computer-implemented method of claim 1, further comprising generating, using multiple sets of the current instrument readings received over time, two-dimensional plots including pressure profiles and flow profiles in normal conditions and leak condition.

5. The computer-implemented method of claim 1, wherein generating the leak signature associated with the FWN includes using artificial intelligence to generate the composite function corresponding to a possible leak.

6. The computer-implemented method of claim 5, wherein comparing the leak signature to the historical leak signatures includes comparing the composite function corresponding to the possible leak to composite functions corresponding to the historical leak signatures.

7. The computer-implemented method of claim 1, further comprising generating a database of historical leak signatures using instrument readings from instruments in plural FWNs.

8. The computer-implemented method of claim 1, wherein automatically providing the notification of the first leak includes one or more of displaying the notification in a graphical user interface (GUI), sending messages to mobile devices of operators and facility owners, sending notifications by email, and sending notifications over the Internet.

9. A non-transitory, computer-readable medium storing one or more instructions executable by a computer system to perform operations comprising:
monitoring, in real-time, a fire water network (FWN) for possible leaks, wherein the FWN is a fire water system that includes a pumping system configured to provide a sufficient flow of water to extinguish a fire, including:
receiving current instrument readings from instruments in the FWN;

generating, in real-time using the current instrument readings, a leak signature associated with the FWN, the leak signature configured to identify a presence or an absence of a first leak in the FWN, wherein generating the leak signature includes using a composite function of multiple time-based functions, including: a first function of a pressure-temperature (PT) field and a PT input, a second function of a flow in and a flow out, a third function of a control valve opening direction, and a fourth function of a number of pumps in the FWN;

comparing, in real-time, the leak signature to historical leak signatures associated with historical leaks; and determining, based on the comparing, the presence or the absence of the first leak in the FWN;

upon determining the presence of the first leak, automatically providing a notification of the first leak; and upon determining the absence of the first leak, continuing to monitor the FWN for second leaks.

10. The non-transitory, computer-readable medium of claim 9, wherein the current instrument readings include pressure readings, flow rates, flow directions, and a number of pumps that are currently running.

11. The non-transitory, computer-readable medium of claim 9, wherein generating the leak signature includes using time-based functions.

12. The non-transitory, computer-readable medium of claim 9, the operations further comprising generating, using multiple sets of the current instrument readings received over time, two-dimensional plots including pressure profiles and flow profiles in normal conditions and leak condition.

13. The non-transitory, computer-readable medium of claim 9, wherein generating the leak signature associated with the FWN includes using artificial intelligence to generate the composite corresponding to a possible leak.

14. The non-transitory, computer-readable medium of claim 13, wherein comparing the leak signature to the historical leak signatures includes comparing the composite function corresponding to the possible leak to composite functions corresponding to the historical leak signatures.

15. The non-transitory, computer-readable medium of claim 9, the operations further comprising generating a database of historical leak signatures using instrument readings from instruments in plural FWNs.

16. The non-transitory, computer-readable medium of claim 9, wherein automatically providing the notification of the first leak includes one or more of displaying the notification in a graphical user interface (GUI), sending messages to mobile devices of operators and facility owners, sending notifications by email, and sending notifications over the Internet.

17. A computer-implemented system, comprising:
one or more processors; and
a non-transitory computer-readable storage medium coupled to the one or more processors and storing programming instructions for execution by the one or more processors, the programming instructions instructing the one or more processors to perform operations comprising:
monitoring, in real-time, a fire water network (FWN) for possible leaks, wherein the FWN is a fire water system that includes a pumping system configured to provide a sufficient flow of water to extinguish a fire, including:
receiving current instrument readings from instruments in the FWN;
generating, in real-time using the current instrument readings, a leak signature associated with the FWN, the leak signature configured to identify a presence or an absence of a first leak in the FWN, wherein generating the leak signature includes using a composite function of multiple time-based functions, including: a first function of a pressure-temperature (PT) field and a PT input, a second function of a flow in and a flow out, a third function of a control valve opening direction, and a fourth function of a number of pumps in the FWN;
comparing, in real-time, the leak signature to historical leak signatures associated with historical leaks; and
determining, based on the comparing, the presence or the absence of the first leak in the FWN;
upon determining the presence of the first leak, automatically providing a notification of the first leak; and
upon determining the absence of the first leak, continuing to monitor the FWN for second leaks.

18. The computer-implemented system of claim 17, wherein the current instrument readings include pressure readings, flow rates, flow directions, and a number of pumps that are currently running.

19. The computer-implemented system of claim 17, wherein generating the leak signature includes using time-based functions.

20. The computer-implemented system of claim 17, the operations further comprising generating, using multiple sets of the current instrument readings received over time, two-dimensional plots including pressure profiles and flow profiles in normal conditions and leak condition.

* * * * *